Sept. 9, 1952  A. A. SCHMITZ  2,609,701
REMOTE CONTROL FOR POWER DRIVES

Filed Feb. 20, 1950

INVENTOR
ALBERT A. SCHMITZ

BY *Young Wright*

ATTORNEYS

Patented Sept. 9, 1952

2,609,701

UNITED STATES PATENT OFFICE 2,609,701

REMOTE CONTROL FOR POWER DRIVES

Albert A. Schmitz, Racine, Wis.

Application February 20, 1950, Serial No. 145,291

2 Claims. (Cl. 74—242.1)

This invention appertains to power transmissions, clutches and the like, and more particularly to a novel means for operating a power drive mechanism from a point remote from the mechanism.

One of the primary objects of my invention is to provide a means for engaging or disengaging a friction clutch or tightening or loosening a belt around a driving and driven pulley by the use of a lever or the like (through a rope or other means attached thereto) actuated in a single direction for engaging or disengaging the drive, said rope or other means reaching a variable distance or in various directions around sheaves if necessary to the location of the operator.

Another salient object of the invention is to provide a means for transforming the consecutive forward movements of a lever to alternate forward and backward movement of a link connected to and actuating another device such as a clutch, or bell crank, etc.

A further salient object of the invention is the provision of a bell crank lever having an idle pulley for engaging the slack run of a drive belt with means connected to said bell crank for moving the idle pulley into and out of position for taking up slack, said means including a crank wheel rotatable in one direction and a link operatively connected to the crank wheel and bell crank with means for positively rotating the crank wheel one-half a revolution on each operation of a lever in the same direction, by a flexible pull member.

Another prime object of my invention is to so-arrange the crank wheel and link, that said link will be on dead center when the idle pulley is in its position for taking up slack in the belt, whereby said pulley will be maintained in its operative position against accidental movement.

A further object of my invention is to provide a novel means for operatively connecting the cable operated lever to the crank wheel through positively connected sprocket wheels, gears or the like, the movement of the lever being such on each forward operation thereof, that the sprocket wheels or gears will turn the crank wheel exactly one-half a revolution.

Figure 1:
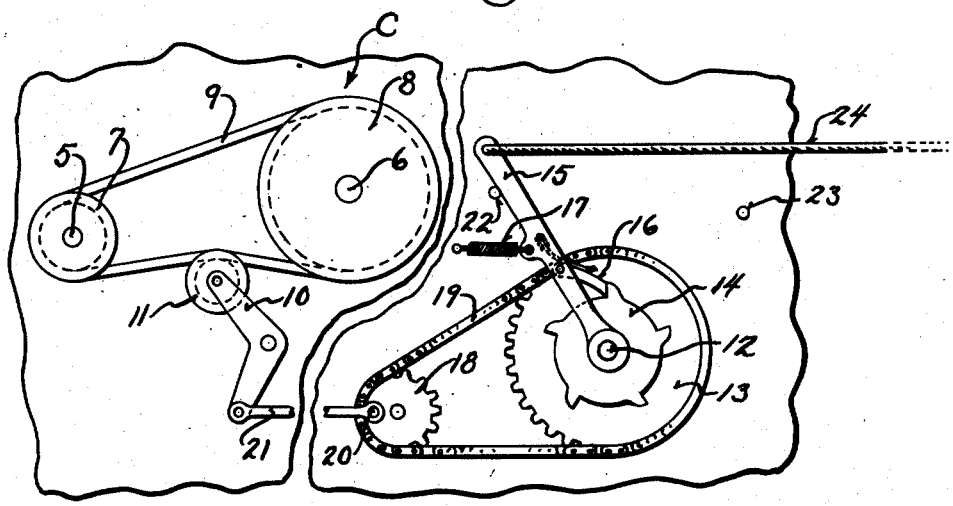

With these and other objects in view, the invention consists in the novel construction, arrangement and formation of parts, as will be hereinafter more specifically described and claimed, and illustrated in the accompanying drawing, in which drawing, Figure 1, is a fragmentary side elevational view illustrating one use of my novel operating device for a power transmission, the power transmission being shown as a belt and pulleys with the belt in its tightened position for establishing a drive between a power shaft and a driven shaft.

Figure 2:
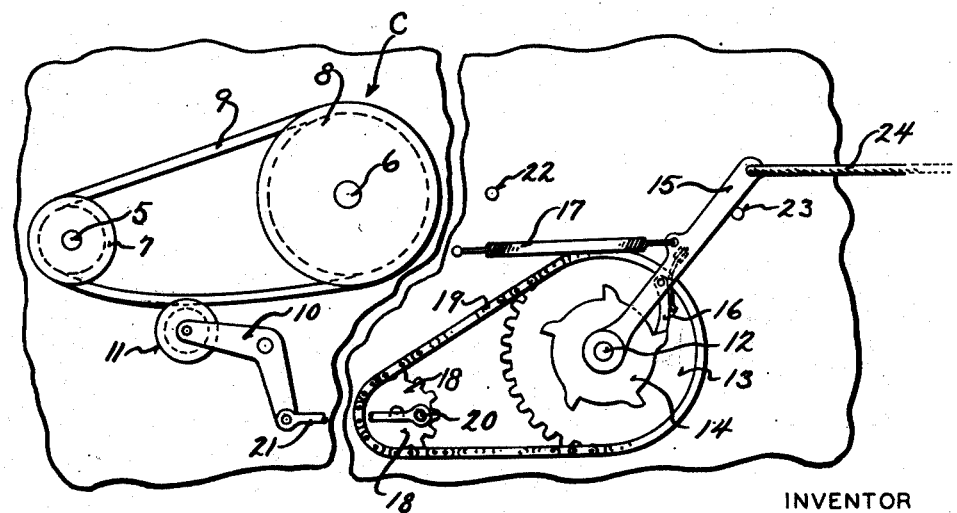

Figure 2, is a view similar to Figure 1, but showing the idle pulley moved away from the belt for bringing about the discontinuance of the drive between the power shaft and the driven shaft.

Referring to the drawing in detail, wherein similar reference characters designate corresponding parts throughout the several views, the letter C generally indicates a power transmission or belt tightener clutch, and as illustrated the same includes a drive or power shaft 5 operatively connected to a driven shaft 6 through the medium of pulleys 7 and 8, keyed or otherwise secured to the shafts 5 and 6 and coupled by a drive belt 9. The drive belt 9 can be of the V type, if preferred, and normally the belt is slack, as shown in Figure 2, and when the belt is slack there is no driving connection between the shafts 5 and 6. While I have illustrated pulleys and a belt, it is to be understood that my invention can be applied to a friction clutch.

To bring about a driving connection, such as between shafts 5 and 6, a bell crank lever 10 is employed and one arm of the lever carries an idle pulley 11, and when the crank is operated, as shown in Figure 1, to bring the pulley 11 into engagement with the lower run of the belt to take up the slack therein, the driving connection between shafts 5 and 6 will be established. Novel means is provided for operating the bell crank lever 10, or other clutch member, at a point remote from the drive and in such a manner that the operating member is moved in one direction only for bringing about the raising and lowering of the pulley 11 into and out of engagement with the belt 9. My novel mechanism includes a shaft 12 having keyed or otherwise secured thereto a sprocket wheel 13 and a ratchet wheel 14. If preferred, the ratchet wheel 14 can form a part of the hub of the sprocket wheel 13. Mounted for free turning movement on the shaft 12 is an operating lever 15 and this lever carries a pivoted spring pressed dog 16 for operative engagement with the teeth of the ratchet wheel 14, when the lever is moved in one direction. A contractile coil spring 17 is connected to the lever and is employed for returning the lever to its normal inoperative position, after operation by an attendant. Adjacent to the sprocket wheel 13, is a second small sprocket wheel 18 mounted for free rotation and the sprocket wheels 13 and 18 are positively connected by a sprocket chain 19. The sprocket wheel 18 can also be in the nature of a crank wheel and consequently the same is provided with an eccentrically disposed crank pin 20. The lower arm of the bell crank 10 and the crank pin 20 are operatively connected by a link 21. While, I have shown sprocket wheels and a sprocket chain, as a positive connection, obviously, other equivalent means can be used in lieu thereof, such as gearing. As heretofore brought out, one of the important features of the invention is that, upon each operation of the lever 15, the sprocket wheel 18 will be moved one-half a revolution, so that the link 21 will be on one side of the sprocket wheel (see Figure 1), upon movement of the lever 15, and on the other side of the sprocket wheel (see Figure 2) upon operation of the lever 15 again in the same direction. This is accomplished by the teeth ratio of sprockets 13 and 18 and ratchet wheel 14. In the present instance, wheel 13 is provided with 35 teeth and sprocket wheel 18 is provided with 14 teeth. Ratchet wheel 14 is provided with 5 teeth. Thus every time wheel 13 makes a 1/5 revolution, sprocket wheel 18 will make a 1/2 revolution. To limit the movement of the lever 15 stops 22 and 23 are provided therefor. My device is particularly adapted to be used in conjunction with a piece of machinery pulled by a tractor and by connecting a flexible member, such as a rope or cable 24 to the lever 15, the lever can be actuated by the driver of the tractor. Thus a pull on the rope 24 in the same direction will operate the lever 15 for connecting or disconnecting a drive.

Considering that the device is in the position shown in Figure 1, with the belt tightened, and it is desired to bring about the discontinuance of the drive between shafts 5 and 6, the rope 24 is pulled to the right (Figure 1) and the lever 15 is moved to the right and ratchet wheel 14 will be moved the distance of 1 tooth and sprocket wheel 13 a distance of 1/5 of its complete revolution. Link 21 will be pulled rearwardly to the position shown in Figure 2, and upon release of lever 15 spring 17 will return the lever to its normal position against stop 22 and the dog 16 will ratchet over the ratchet wheel 14 and engage the next new tooth. When it is desired to tighten the belt, then the rope 24 is again pulled to the right (Figure 2), and the lever 15 is given another movement to the right and the link 21 will be thrust forwardly to the position in Figure 1. It is to be noted that the position of the link 21 in Figure 1, is such that the link is on dead center and consequently the idle pulley 11 will be held on its elevated position against accidental displacement.

Changes in details may be made without departing from the spirit or the scope of the invention, but what is claimed as new is:

1. In an operating device for connecting and disconnecting a power drive, a crank wheel, an actuating lever, a link operatively connecting the crank wheel to the actuating lever, the connection of the link with the crank wheel being eccentric with respect to the axis of the crank wheel, an operating member, and means for rotating the crank wheel 1/2 a revolution upon each movement of the operating member in the same direction, said link being on dead center upon each operation of the crank wheel.

2. In a device for establishing a drive between a drive and a driven shaft including pulley wheels on said shafts and a connecting pulley belt, a bell crank lever, an idle pulley on one arm of said bell crank lever for engaging the lower run of the belt, a crank wheel, a link operatively connecting the crank wheel to the other arm of the bell crank, the connection of the link with the crank wheel being eccentric with respect to the axis of the crank wheel, an operating member, and means for rotating the crank wheel 1/2 a revolution upon each movement of the operating member in the same direction, said link being on dead center upon each operation of the crank wheel.

ALBERT A. SCHMITZ.

REFERENCES CITED

The following references are of record in the file of this patent:

UNITED STATES PATENTS

| Number | Name | Date |
|---|---|---|
| 433,205 | Jones et al. | July 29, 1890 |
| 639,237 | Hirsch | Dec. 19, 1899 |
| 776,174 | Dixon | Nov. 29, 1904 |
| 1,390,536 | Manning | Sept. 13, 1921 |
| 1,422,809 | Anderson | July 18, 1922 |